(12) United States Patent
Takenaka

(10) Patent No.: US 6,351,233 B1
(45) Date of Patent: Feb. 26, 2002

(54) VIDEOCONFERENCE SYSTEM

(75) Inventor: Hiroshi Takenaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/703,732

(22) Filed: Nov. 2, 2000

(30) Foreign Application Priority Data

Nov. 4, 1999 (JP) .......................................... 11-313168

(51) Int. Cl.$^7$ ............................. H03M 1/12; H04N 7/14
(52) U.S. Cl. ....................................... 341/155; 348/13
(58) Field of Search ................................ 341/155, 114, 341/144; 348/14, 15, 13

(56) References Cited

U.S. PATENT DOCUMENTS 5,510,858 A * 4/1996 Shido et al. ................. 348/718

FOREIGN PATENT DOCUMENTS

JP          408102144   *  4/1996   ........... G11B/20/10

OTHER PUBLICATIONS

"The Latest MPEG Textbook", (in Japanese), Ascii Publishing Co., Ltd. 1995, pp. 234–239.

* cited by examiner

Primary Examiner—Peguy JeanPierre
(74) Attorney, Agent, or Firm—Sughrue Mion, PLLC

(57) ABSTRACT

A videoconference allowing an realistic videoconference without the need for increasing the header information and regardless of compression/expansion system is disclosed. A transmitting terminal simultaneously and periodically embeds a marking signal to each of the image and voice signals corresponding to each other. After compressing and multiplexing each of the marked image and voice signals, they are transmitted to the other party. The receiving terminal expands the received image and voice signals and detects an arrival time difference based on marking signals detected from the received image and voice signals. Depending on the arrival time difference, timings of the received image and voice are adjusted.

17 Claims, 6 Drawing Sheets

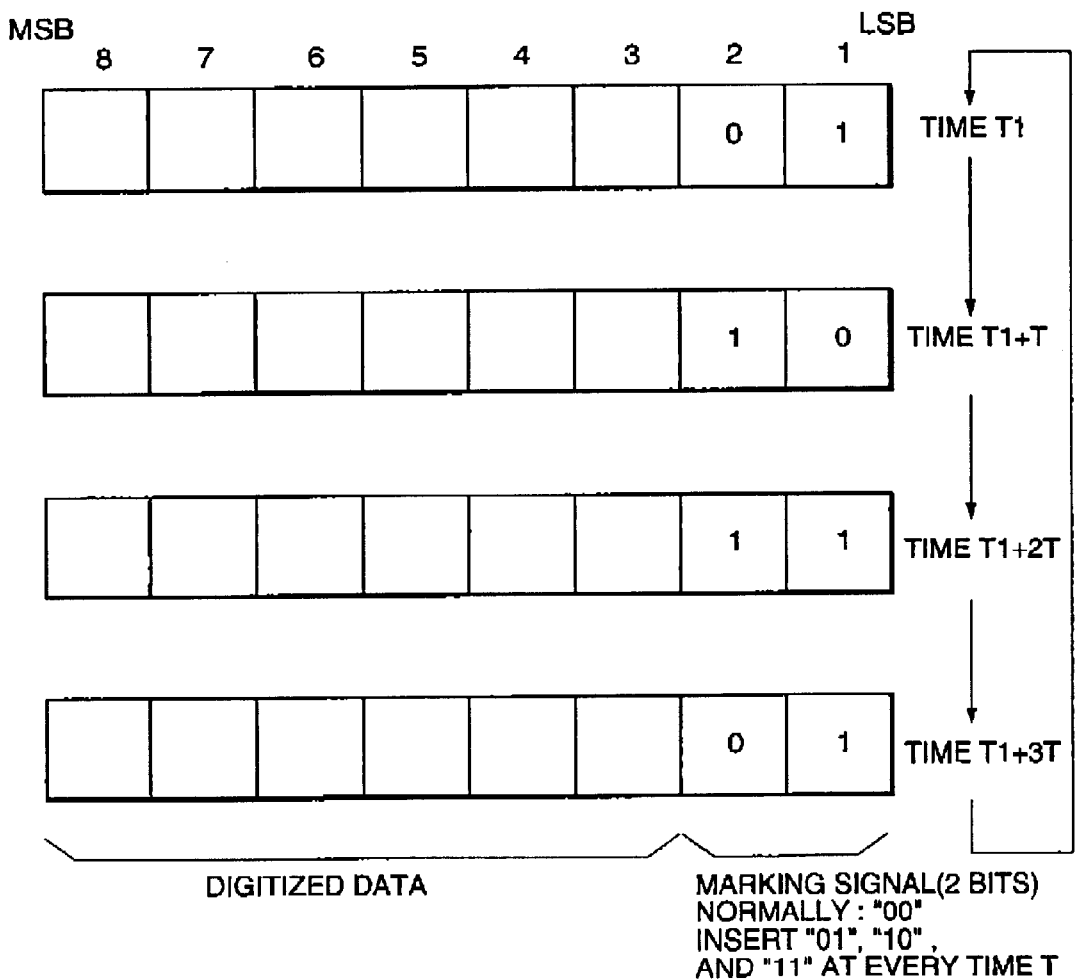

VIDEOCONFERENCE SYSTEM

BACKGROUND OF THE INVENTION

1. Field of the Invention

The present invention relates to a videoconference terminal and an image/voice regeneration method to be used for this videoconference terminal, and relates, more particularly, to a method of regenerating an image and voice at a videoconference terminal.

2. Description of Related Art

In the transmission of image and voice signals by using a videoconference terminal, the received timings of the image signal and voice signal after the compression and expansion of these signals become different from the timings when the original signals were transmitted. This is because the time required for compressing and expanding the image signal is different from the time required for compressing and expanding the voice signal.

In general, an image signal requires a larger amount of processing information than a voice signal. Therefore, at the receiving end, the processing of the image signal is completed later than the voice signal. This results in an unnatural regeneration of the signals that the image appears after the voice.

In order to solve this problem, there has been a conventional videoconference terminal that has a function of selecting from among preset fixed values a delay volume for delaying the timing of regenerating the voice at the receiving end. When the videoconference terminal having this function is used, it is possible to match to some extent the timing of regenerating the image with the timing of regenerating the voice.

As another conventional technique for solving the above problem, there has been an image/voice synchronization system of the MPEG-2 (Moving Picture Experts Group phase 2) that is one of motion picture compression systems.

According to the MPEG-1 (Moving Picture Experts Group phase 1) system and the MPEG-2 system (hereinafter to be collectively referred to as the MPEG system), each of an image packet and a voice packet has own time stamp called PTS (Presentation Time Stamp).

The PTS is stored in the header (packet header) of the image packet and the voice packet respectively at the time of transmitting the signals to the receiving end.

FIG. 1 shows a state that the image and the voice are multiplexed with the packet by the MPEG-2. The packet header is embedded in the image packet and the voice packet respectively. A value of the PTS is stored in the packet header.

In the mean time, at the receiving end, there is a counter (STC: System Time Clock) that is accurately synchronized with the transmitting end. A decoder regenerates the image and the voice when the value of the PTS stored in each packet header of the received image and voice becomes equal to the value of the STC of the receiver.

In other words, when the value of the PTS (a regeneration time) is stored in advance at the transmitting end such that the image and the voice are regenerated at the same time at the receiving end, the receiver can obtain an output image and an output voice that are synchronized with each other. The MPEG system is described in detail in "The Latest MPEG Textbook" (in Japanese), Ascii Publishing Co., Ltd., 1995.

According to the above-described conventional videoconference terminal, however, there has been the following problem. When the image and the voice are transmitted, the time required for the compression processing and the expansion processing is not constant and is different depending on the contents of the input signal. Therefore, according to the conventional method of fixing the delay volume, it is not always possible to make the timing of regenerating the image and the timing of regenerating the voice coincide with each other.

Further, according to the image/voice synchronization system that is employed in the MPEG system, it is always possible to make the timing of regenerating the image and the timing of regenerating the voice coincide with each other. However, this system has the following problems.

First, according to the above image/voice synchronization system, a large amount of information is required for the synchronized regeneration of signals. A set range of the PTS value is taken large (24 hours or more) at the receiving end. Therefore. the data width of the PTS is as large as 44 bits. As a result, the circuit scale becomes large. Further, as the PTS is stored in the header, the length of the header becomes large.

Second, the above-described image/voice synchronization system is an MPEG exclusive system. As the PTS is stored in the packet header that is own to the MPEG system, only a system that uses the MPEG system can utilize the PTS. Therefore. there is no compatibility with other motion picture encoding systems.

SUMMARY OF THE INVENTION

The present invention has been made to solve the above-described conventional problems. It is, therefore, an object of the present invention to provide a videoconference terminal and an image and voice regeneration system to be used therefor, which are capable of easily achieving a videoconference with a sense of realism by regenerating the image and the voice at the same timing as that of the transmitting end, without the need for increasing the header information and regardless of compression/expansion system.

In order to meet the above object, according to the present invention, there is provided a videoconference terminal that regenerates an image and voice by always accurately matching the regeneration timing with that at the transmitting end. Therefore, at the receiving end, it is possible to regenerate the image and voice at the same timing as that at the transmitting end.

More specifically. according to the videoconference terminal of the present invention, a videoconference terminal comprising a transmitter and a receiver, wherein the transmitter comprises: an analog-to-digital converter for converting input analog image and analog voice signals to input digital image and voice signals, respectively; a marker for simultaneously and periodically embedding a marking signal in the input digital image signal and the input digital voice signal corresponding to the input digital image signal to produce digital image and voice signals: and a data compressor for compressing the digital image signal and the digital voice signal to produce compressed image signal and compressed voice signal which are transmitted to another end of videoconference.

The receiver comprises: a data expander for expanding received image signal and received voice signal to produce received digital image signal and received digital voice signal; a time difference detector for detecting an arrival time difference between the received digital image signal and the received digital voice signal based on marking signals detected from the received digital image signal and the received digital voice signal, respectively; a digital-to-analog converter for converting the received digital image signal and the received digital voice signal to a received analog image signal and a received analog voice signal; and an adjuster for adjusting timings of the received analog image signal and the received analog voice signal depending on the arrival time difference.

The analog image signal input from a camera or the like is quantized by an image A/D converter. The quantized signal is then passed through a marking signal adding circuit, and is compressed according to a transmission speed in a transmission path by an image compressing circuit. Thereafter, the signal is multiplexed with the voice signal by a multiplexing circuit, and the multiplexed signal is sent to the transmission path.

On the other hand, the analog voice signal input from the microphone or the like is quantized by a voice A/D converter. The quantized signal is then paused through a marking signal adding circuit, and is compressed by a voice compressing circuit. Thereafter, the signal is multiplexed with the image signal by a multiplexing circuit, and the multiplexed signal is sent to the transmission path. The image compressing circuit and the voice compressing circuit compress the quantized image and voice signals respectively by using a reversible encoding algorithm.

At the receiving end, the signal received from the other side of the communication through the transmission path is separated into the image signal and the voice signal by a separating circuit. The image signal is passed through an image expanding circuit, a marking signal detecting circuit, and a D/A converter. Thus, the signal is regenerated as an analog image output signal.

Similarly, the voice signal is also passed through a voice expanding circuit, a marking signal detecting circuit, and a D/A converter. Thus, the signal is regenerated as an analog voice output signal. The image expanding circuit and the voice expanding circuit expand the compressed image signal and the compressed voice signal respectively by the algorithm reversed from that of the transmitting end.

According to the videoconference terminal of the present invention, the A/D converter quantizes the input analog image signal and the input analog voice signal respectively. Immediately after the signal quantization, that is, before these signals are compressed, marking signals are embedded in the quantized image signal and the quantized voice signal respectively by the marking signal adding circuit simultaneously and periodically. Each marking signal is embedded in each signal by replacing a part of the bits of the signal with the marking signal.

Based on the reversible algorithm for the compression and expanding of the signals, the signals before the compression are completely regenerated at the receiving end. Therefore, it becomes possible to detect the marking signal embedded in at the transmitting end, by the marking signal detecting circuit at the receiving end. Thus, it is possible to know an arrival time difference t between the arrival time of the marking signal embedded in the image signal and the arrival time of the marking signal embedded in the voice signal.

Then, the delay circuit delays the output of the first-arrived signal out of the image signal and the voice signal by the arrival time difference t. As a result, at the receiving end, it becomes possible to regenerate the image and the voice at the same timing as that when the signals are transmitted at the transmitting end. In other words, even when there is a time difference between the image signal arrival time and the voice signal arrival time, it is always possible to regenerate at the receiver's videoconference terminal the image and the voice at the same timing as the transmission timing of the signals.

According to the method of the present invention, the marking signals are processed immediately after the image signal and the voice signal have been quantized, or immediately before the signals are converted into analog signals. Therefore, when the reversible algorithm is used, it is possible to provide a synchronized regeneration function for synchronously regenerating the image and the voice without depending on the compression and expansion system. Further, as the short marking signal is directly embedded in the image signal and the voice signal respectively without using a long time stamp, it is possible to achieve a synchronized regeneration of the image and voice based on a smaller amount of information.

BRIEF DESCRIPTION OF THE DRAWINGS

FIG. 6 is a diagram showing a format of a signal transmitted between the videoconference terminals according to another embodiment of the present invention.

DETAILED DESCRIPTION OF THE PREFERRED EMBODIMENTS

The present invention will be explained below with reference to the drawings.

Figure 1:
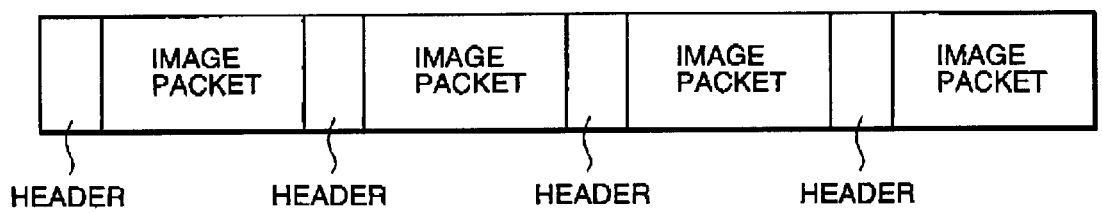
FIG. 1 is a diagram showing a format of a signal transmitted between the videoconference terminals according to a conventional technique.
Figure 2:
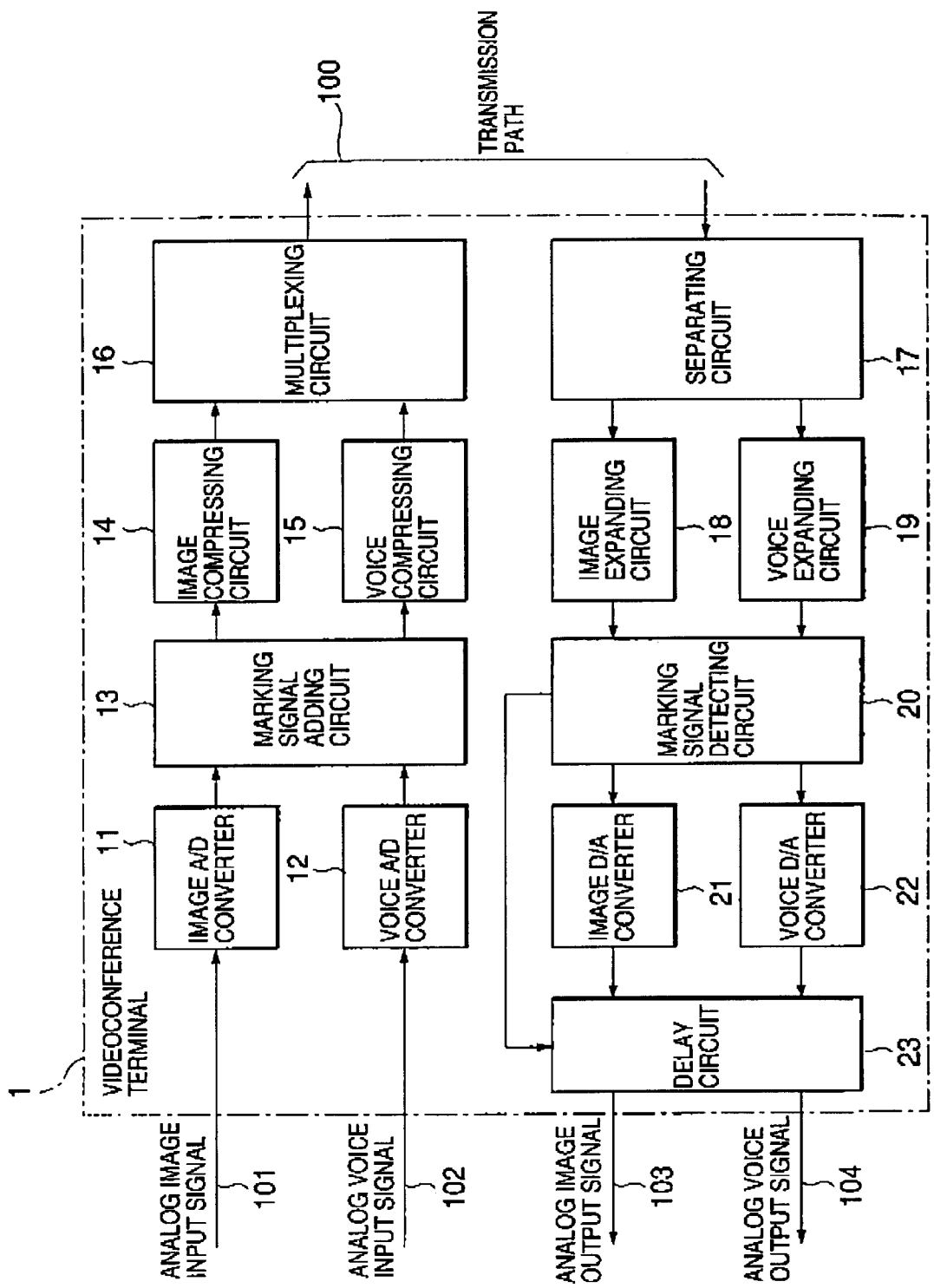
FIG. 2 is a block diagram showing an example of a videoconference terminal according to the present invention.

Referring to FIG. 2, a videoconference terminal 1 is composed of an image A/D (analog-to-digital) converter 11, a voice A/D converter 12, a marking signal adding circuit 13, an image compressing circuit 14, a voice compressing circuit 15, a multiplexing circuit 16, a separating circuit 17, an image expanding circuit 18, a voice expanding circuit 19, a marking signal detecting circuit 20, an image D/A (digital-to-analog) converter 21, a voice D/A converter 22, and a delay circuit 23.

At a transmitter side, an analog image input signal 101 from a camera or the like (not shown) is quantized by the image A/D converter 11. The quantized signal is added with a marking signal by the marking signal adding circuit 13. The signal is then compressed by the image compressing circuit 14 according to a transmission speed of a transmission path 100. Thereafter, the image signal is multiplexed with a voice signal by the multiplexing circuit 16, and the multiplexed signal is sent out to the transmission path 100.

On the other hand, an analog voice input signal 102 from a microphone or the like (not shown) is quantized by the voice A/D converter 12. The quantized signal is then added with a marking signal by the marking signal adding circuit 13. The signal is then compressed by the voice compressing circuit 15. Thereafter, the voice signal is multiplexed with the image signal by the multiplexing circuit 16. and the multiplexed signal is sent out to the transmission path 100.

The marking signal adding circuit 13 adds marking signals to the image signal and the voice signal simultaneously and periodically, immediately after these signals have been quantized by the image A/D converter 11 and the voice A/D converter 12 respectively, that is, before the signals are compressed. Each marking signal is embedded in each signal by replacing a part of the bits of the signal with the marking signal.

The image compressing circuit 14 and the voice compressing circuit 15 compress the image signal and the voice signal added with the mark signals by the marking signal adding circuit 13 respectively. In other words, these compressing circuits compress the quantized image and voice signals, by using a reversible encoding algorithm.

At the receiving end, the signal received from the other party of the communication via the transmission path 100 is separated into the image signal and the voice signal by the separating circuit 17. The compressed images signal is expanded by the image expanding circuit 18 by the algorithm revered from the algorithm of the transmitting end. The expanded signal is input to the image D/A converter 21 via the marking signal detecting circuit 20. The image signal is then regenerated as an analog image output signal 103 by the image D/A converter 21.

The voice signal is expanded by the voice expanding circuit 19 by the algorithm revered from the algorithm of the transmitting end, in a similar manner to that of expanding the image signal. The expanded signal is input to the voice D/A converter 22 via the marking signal detecting circuit 20. The voice signal is then regenerated as an analog voice output signal 104 by the voice D/A converter 22.

Based on the above arrangement, the marking signal detecting circuit 20 at the receiving end detects the marking signals embedded in at the transmitting end. Thus, the marking signal detecting circuit 20 can know a time difference t between the arrival time of the marking signal embedded in the image signal and the arrival time of the marking signal embedded in the voice signal. The delay circuit 23 delays the output of the first-arrived signal out of the image signal and the voice signal by the arrival time difference t. As a result, at the receiving end, it becomes possible to regenerate the image and the voice at the same timing as that when the signals are transmitted at the transmitting end.

In other words, even when there is a time difference between the image signal arrival time and the voice signal arrival time, at the signal receiver's videoconference terminal 1, the image and the voice can always be regenerated at the same timing as the original signal transmission timing.

According to the videoconference terminal 1 in an example of the present invention, the marking signals are processed immediately after the image signal and the voice signal have been quantized, or immediately before the signals are converted into analog signals. Therefore, when the reversible algorithm is used, it is possible to provide a synchronized regeneration function for synchronously regenerating the image and the voice without depending on the compression and expansion system. Further, as the short marking signal is directly embedded in the image signal and the voice signal respectively without using a long time stamp, it is possible to achieve a synchronized regeneration of the image and voice based on a smaller volume of information.

Figure 3:
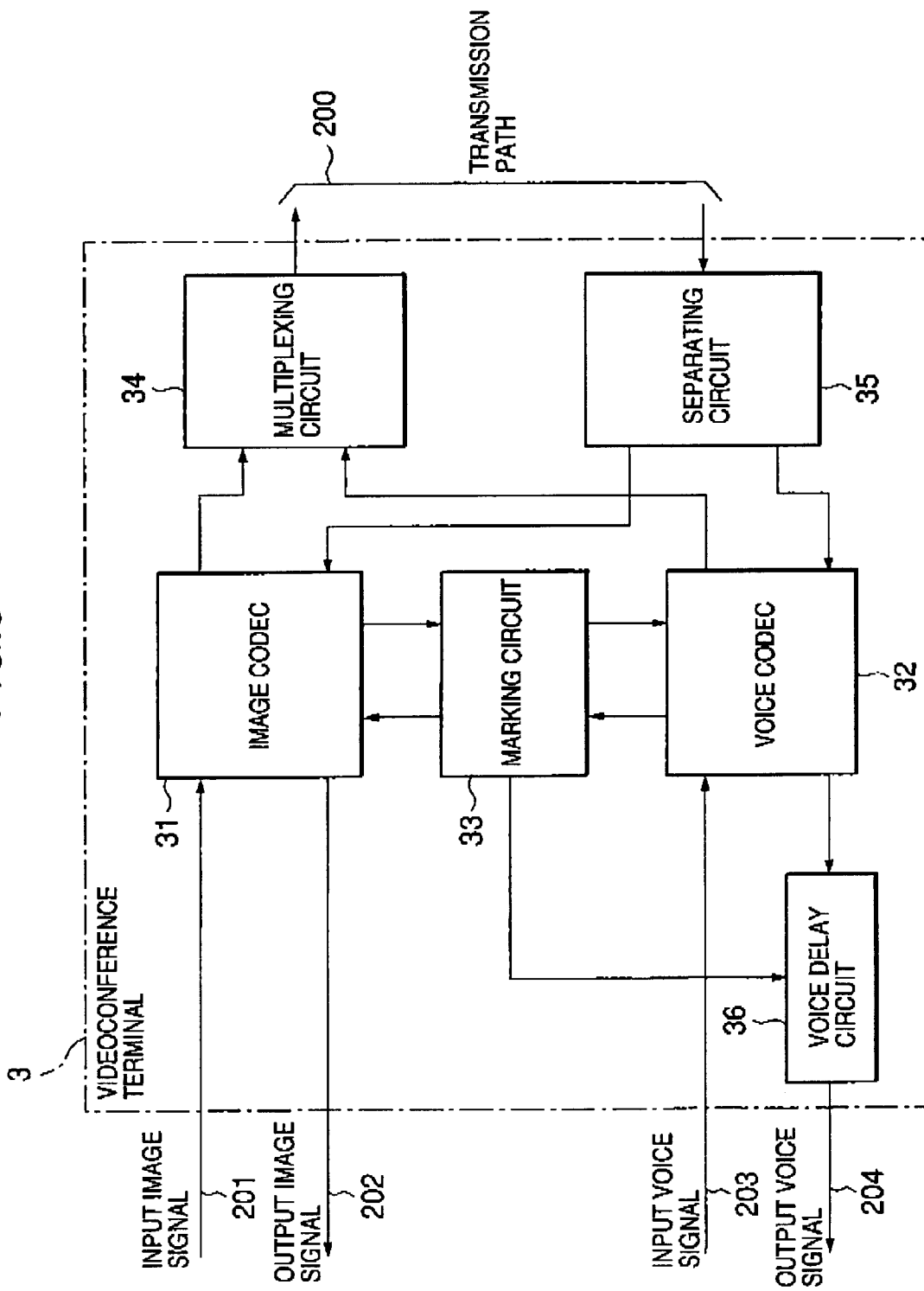
FIG. 3 is a block diagram showing another example of a videoconference terminal according to the present invention.

Referring to FIG. 3. a videoconference terminal 3 is composed of an image codes (corder/decorder) 31, a voice codes 32, a marking circuit 33, a multiplexing circuit 34, a separating circuit 35, and a voice delay circuit 36. The image codec 31 quantizes and compresses an input image signal 201, expands and converts a received image signal into an analog signal, and outputs the signal as an output image signal 202. The voice codec 32 quantizes and compresses an input voice signal 203, expands and converts a received voice signal into an analog signal, and outputs the signal as an output voice signal 204.

The marking circuit 33 sends marking signals to an image signal and a voice signal encoded respectively, and processes marking signals detected from an image signal and a voice signal received respectively. The multiplexing circuit 34 multiplexes output signals from the image codec 31 and the voice codec 32, and sends out the multiplexed result to the transmission path 200. The separating circuit 35 separates the signal received from the transmission path 200 into the image signal and the voice signal. The voice delay circuit 36 delays the output signal of the voice signal according to an instruction from the marking circuit 33.

Figure 4:
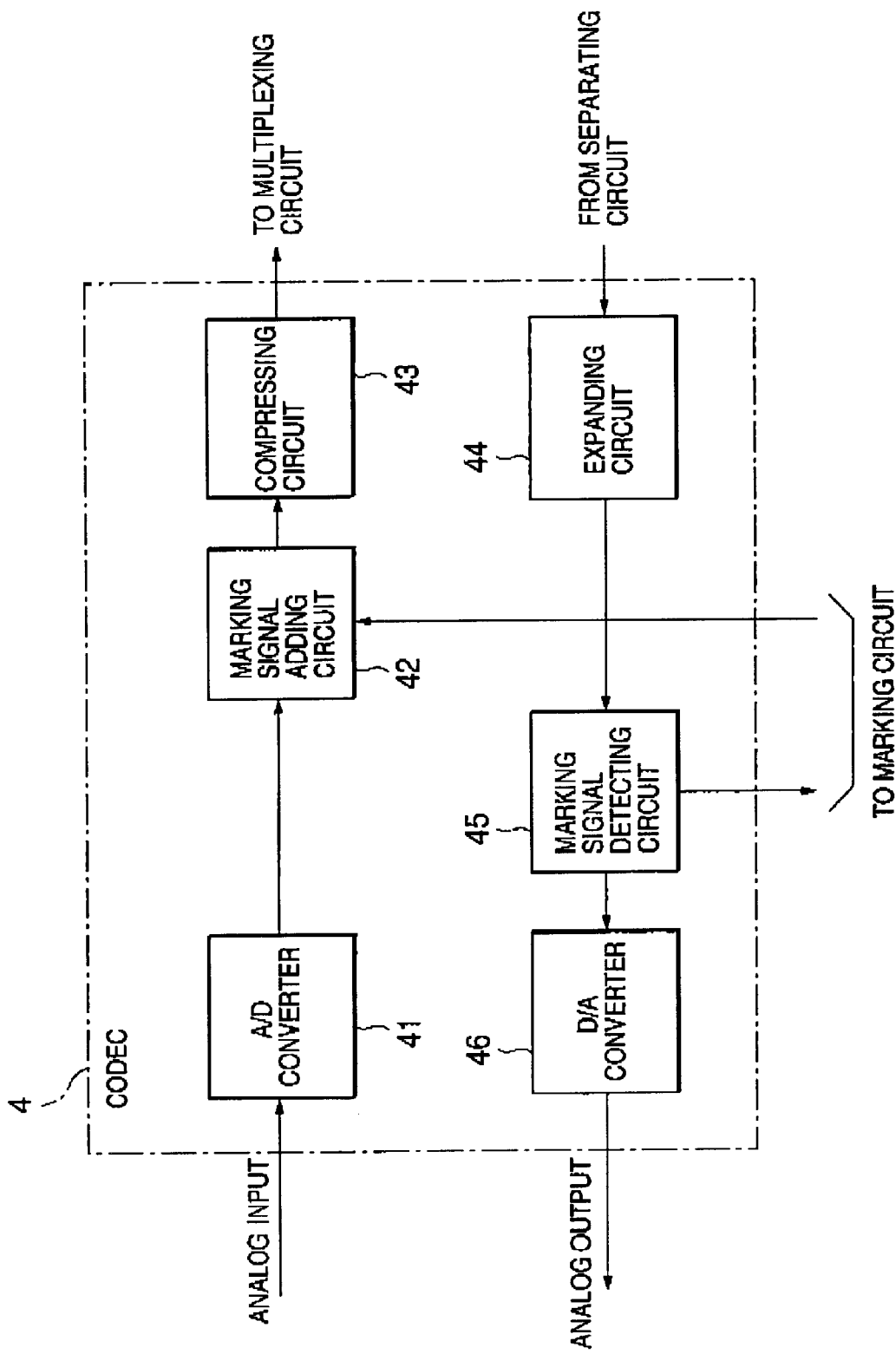
FIG. 4 is a block diagram showing a system configuration of an image codec (coder/decorder) and a voice codec.

Referring to FIG. 4, an internal configuration of the image codec 31 and the voice codec 32 that take a common circuit configuration are shown. A codec 4 is composed of an A/D converter 41, a marking signal adding circuit 42, a compressing circuit 43, an expanding circuit 44, a marking signal detecting circuit 45, and a D/A converter 46.

The compressing circuit 43 and the expanding circuit 44 carry out the processing based on a reversible algorithm. The marking signal adding circuit 42 and the marking signal detecting circuit 45 are connected to the marking circuit 33 shown in FIG. 3. The output of the marking circuit 33 controls the voice delay circuit 36 connected to the output of the voice codes 32.

Figure 5:
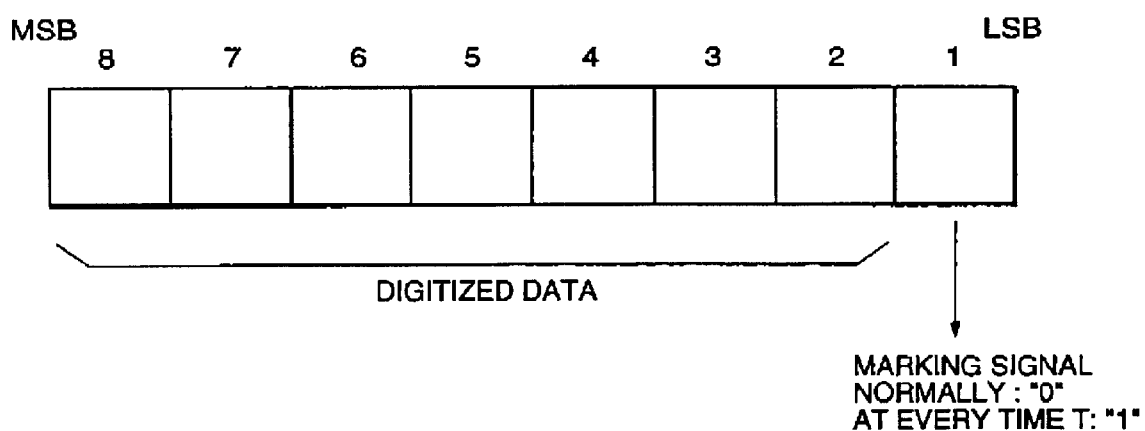
FIG. 5 is a diagram showing a format of a signal transmitted between the videoconference terminals according to the embodiment of the present invention.

Referring to FIG. 5, a signal transmitted from the transmitting end to the receiving end consists of a digitized data and a marking signal. Normally, "0" is used for the marking signal, and is embedded in the signals. At every time T, "0" is used for the marking signal.

The operation of the videoconference terminal 3 according to the present embodiment will be explained with reference to FIG. 3 to FIG. 5. The processing at the transmitting end will be explained first. The analog image input signal 201 and the analog voice input signal 203 that have been input to the videoconference terminal 3 from a camera and a microphone (not shown) are quantized by the A/D converters 41 located within the image codec 31 and the voice codec 32 respectively. The quantized signals are then added with marking signals by the marking circuit 33 respectively.

The marking signal is used for measuring a delay of the image signal from the voice signal at the time of regenerating the signals. In the present embodiment, the marking signal is a one-bit digital signal. Normally, "0" is inserted into the marking signal, and "1" is inserted into the marking signal at each predetermined period T (for example, 50 millisecond).

In the marking signal adding circuit 42, a part of the data of the image signal and the voice signal quantized by the A/D converter 41 respectively is replaced by this marking signal. In order to avoid substantially damaging the original information of the image signal and the voice signal by this replacement processing, the lowest bit of the quantized signal is replaced by this marking signal. For example, in the case of an eight-bit quantized data as shown in FIG. 4, the lowest eighth-bit is replaced by this marking signal. The data of the remaining high-order seven bits is transmitted without any change.

The image signal and the voice signal, each added with the marking signal, are compressed by a reversible algorithm within the image codec 31 and the voice codec 32 respectively. As examples of a reversible algorithm, there are a "variable-length encoding system" using a Huffman code, and a "run-length encoding system" using an MH code (Modified Huffman code).

The processing at the receiving end will be explained next. A signal received from the transmission path 200 is separated into the image signal and the voice signal by the separating circuit 35. Then, the image signal and the voice signal are expanded inside the image codec 31 and the voice codec 32 respectively.

As the reversible compression algorithm is used as described above, each signal after the expansion processing, including the marking signal, is completely restored to the original bit string in the state before the signal was compressed. Then, before the image signal and the voice signal are decoded into the analog signals by the D/A converters 46 within the respective codecs, the marking signal detecting circuits 45 in these codecs monitor the lowest one bit of the image data and the voice data respectively, and detect the respective marking signals as "1".

In general, the time required for compressing and expanding the image signal is longer than the time required for compressing and expanding the voice signal. Therefore, it can be understood that the image signal is delayed from the voice signal. Thus, a timer (not shown) is started at a point of time when the marking signal "1" has been detected from the voice signal. Following this, the marking signal "1" is detected from the image signal. A time value t of the timer when the marking signal "1" has been detected from the image signal indicates that the image signal has been received with a delay of the time t from the reception of the voice signal.

Therefore, the voice delay circuit 36 connected to the output of the regeneration side of the voice codec 32 is controlled so that the voice output from the marking circuit 33 is delayed by the time t. Based on this arrangement, the image is output with no delay from the voice. As a result, it becomes possible to achieve a videoconference with a sense of realism.

As explained above, the arrival time difference t of the marking signals embedded in the image signal and the voice signal immediately after their quantization, is measured at the receiving end. Thus, at the receiving end, it becomes possible to understand the time difference t between the arrival time of the image signal and arrival time of the voice signal. As a result, it is possible to regenerate the image signal and the voice signal at the same timing as that at the image transmission time. Based on this arrangement, it becomes possible to achieve a videoconference with a sense of realism.

FIG. 6 shows a modification of the above-described embodiment, in the pattern of replacement of a part of the signal transmitted and received between the transmitting end and the receiving end with a marking signal. A videoconference terminal used in this embodiment has a similar system configuration to that of the videoconference terminal 3 in the above-described example shown in FIG. 3. Only a method of adding the marking signal is different from that of the above-described embodiment.

The marking circuit 33 usually inserts "00" into the lowest two bits of the output of each of the image signal and the voice signal from the A/D converter 41 at the time of the signal transmission. At every predetermined time T, the following values are input. That is, "01" is inserted at time T1, "10" is inserted at time T1+T, and "11" is inserted at time T1+2T sequentially. At time T1+3T, the marking signal becomes "01" again. Thus, the above insertion cycle is repeated. FIG. 6 illustrates this state. The marking circuit 33 detects the pattern of "01", "10" and "11" from the voice signal and the image signal respectively at the times when these signals are received. The marking circuit 33 then calculates a delay time between these times in a similar manner to that explained above.

By preparing the three kinds of marking signals as described above, it becomes possible to arrange such that the same marking signal appears only at every three cycles. When only one kind of marking signal is used, the same marking signal appears after one cycle. Therefore, it is not possible to accurately measure a delay larger than the insertion cycle.

On the other hand, when the insertion cycle of the marking signal is made longer, the interval of updating the delay time also becomes long. Therefore, it becomes difficult to trace the change in a delay time of a short interval. However, according to the present system of using a plurality of marking signals, the tracing of the delay time is not damaged due to a long cycle of delay time measurement. Even if the image signal is delayed by more than the marking signal insertion cycle, it is possible to know accurately the delay time of the image signal.

As a further modification of the above embodiment, the marking bit may use three bits or more bits. Generally, when n bits (where n is a positive integer) are allocated to the marking signal, it is possible to use (2n−1) marking signals. When the marking signal insertion interval is expressed as T, it is possible to detect up to (2n−1)×T delays.

However, when many bits are allocated to the marking signal, the information of the original signal is lost by that amount. Therefore, it is preferable that the number of bits allocated to the marking signal is determined by taking into account the quantized number of bits of the image and voice signals, a permissible value of image and voice deterioration due to the replacement of a part of the data with the marking signal, and a required performance level of delay detection.

As explained above, according to the present invention, at the transmitting end, predetermined short marking signals are embedded in the quantized image and voice signals simultaneously and periodically. At the receiving end, the arrival time difference of the marking signals embedded in the image and voice signals respectively is detected. One of the outputs of the image and voice signals is delayed according to the result of this detection. Based on this arrangement, there is an effect that it is possible to easily achieve a natural videoconference in which the image and the voice are regenerated at the same timing as that at the transmitting end, without increasing the amount of the header information and regardless of compression/expansion system.

What is claimed is:

1. A videoconference terminal comprising a transmitter and a receiver, wherein
the transmitter comprises:
an analog-to-digital converter for converting input analog image and analog voice signals to input digital image and voice signals, respectively;
a marker for simultaneously and periodically embedding a marking signal in the input digital image signal and the input digital voice signal corresponding to the input digital image signal to produce digital image and voice signals; and a data compressor for compressing the digital image signal and the digital voice signal to produce compressed image signal and compressed voice signal which are transmitted to another end of videoconference, and the receiver comprises:

a data expander for expanding received image signal and received voice signal to produce received digital image signal and received digital voice signal;

a time difference detector for detecting an arrival time difference between the received digital image signal and the received digital voice signal based on marking signals detected from the received digital image signal and the received digital voice signal, respectively;

a digital-to-analog converter for converting the received digital image signal and the received digital voice signal to a received analog image signal and a received analog voice signal; and an adjuster for adjusting timings of the received analog image signal and the received analog voice signal depending on the arrival time difference.

2. A videoconference terminal according to claim 1, wherein the marker replaces a predetermined signal portion of each of the input digital image signal and the input digital voice signal with the marking signal.

3. A videoconference terminal according to claim 2, wherein the predetermined signal portion is an n-bit low-order portion of each of the input digital image signal and the input digital voice signal with the marking signal, where n is an integer greater than 0.

4. A videoconference terminal according to claim 3, wherein the predetermined signal portion is the least significant bit (LSB).

5. A videoconference terminal according to claim 4, wherein one value of the least significant bit (LSB) is normally used and the other value is used for marking.

6. A videoconference terminal according to claim 3, wherein the predetermined signal portion is an m-bit (m>1) signal portion including the least significant bit (LSB).

7. A videoconference terminal according to claim 6, wherein a predetermined one of $2^m$ values obtained from the marking signal is normally used and the remainders are used in a round-robin fashion.

8. A videoconference terminal according to claim 1, wherein the data compressor and the data expander are implemented with a reversible compression/expansion algorithm.

9. A videoconference terminal according to claim 1, wherein the adjuster comprises a delay circuit for delaying the received analog voice signal by an amount of the arrival time difference.

10. An image and voice regeneration method in a videoconference system, comprising the steps of:

at a transmitting side, a) converting input analog image and analog voice signals to input digital image and voice signals, respectively;

b) embedding a marking signal in the input digital image signal and the input digital voice signal corresponding to the input digital image signal simultaneously and periodically to produce digital image and voice signals;

a) compressing the digital image signal and the digital voice signal to produce compressed image signal and compressed voice signal;

d) multiplexing the compressed image signal and the compressed voice signal to transmit them to another end of videoconference;

at a receiving side, e) expanding the compressed image signal and compressed voice signal to produce received digital image signal and received digital voice signal:

f) detecting an arrival time difference between the received digital image signal and the received digital voice signal based on marking signals detected from the received digital image signal and the received digital voice signal, respectively;

g) converting the received digital image signal and the received digital voice signal to a received analog image signal and a received analog voice signal:

h) adjusting timings of the received analog image signal and the received analog voice signal depending on the arrival time difference; and i) regenerating image and voice from received analog image and voice signals whose timings have been adjusted.

11. An image and voice regeneration method according to claim 10, wherein, in the step (b), a predetermined signal portion of each of the input digital image signal and the input digital voice signal is replaced with the marking signal.

12. An image and voice regeneration method according to claim 11, wherein the predetermined signal portion is an n-bit low-order portion of each of the input digital image signal and the input digital voice signal with the marking signal, where n is an integer greater than 0.

13. An image and voice regeneration method according to claim 12, wherein the predetermined signal portion is the least significant bit (LSB).

14. An image and voice regeneration method according to claim 13, wherein one value of the least significant bit (LSB) is normally used and the other value is used for marking.

15. An image and voice regeneration method according to claim 12, wherein the predetermined signal portion is an m-bit (m>1) signal portion including the least significant bit (LSB).

16. An image and voice regeneration method according to claim 15, wherein a predetermined one of $2^m$ values obtained from the marking signal is normally used and the remainders are used in a round-robin fashion.

17. An image and voice regeneration method according to claim 10, wherein, in the step (h), the received analog voice signal is delayed by an amount of the arrival time difference.

\* \* \* \* \*